United States Patent Office 3,369,034
Patented Feb. 13, 1968

3,369,034
PROCESS FOR SEPARATING SAPONIFIABLES AND UNSAPONIFIABLES IN MARINE ANIMAL OILS
William Chalmers and Alexander J. Shaw, Vancouver, British Columbia, Canada, assignors to Eversharp, Inc., a corporation of Delaware
No Drawing. Filed Apr. 27, 1964, Ser. No. 362,918
10 Claims. (Cl. 260—412.1)

ABSTRACT OF THE DISCLOSURE

Saponifiable and unsaponifiable matter in marine animal oil can be separated more efficiently following saponification and the first solvent extraction if the subsequent solvent extractions are carried out in the presence of an alkali metal salt of phosphoric acid.

---

This invention relates to a process for separating the saponifiable portion from the unsaponifiable portion of marine oils.

Oils from vegetable sources or from terrestrial animals normally contain a relatively small portion of unsaponifiable materials and are processed into soaps by alkali treatment, which forms the alkali salt of the fatty acid soaps and glycerol. A "salting out" process coagulates the soap solids, which are then separated from the liquid portion by methods known in the art. The soaps may then be further purified per se or may be converted by the addition of strong acids to free fatty acids, which also have commercial value. Glycerol is recovered from the liquid portion by methods known in the art.

Oils from marine sources contain a relatively high proportion of unsaponifiables that may be further processed into products for commerce, such as for example, vitamin A. It is desirable to separate the unsaponifiable portion from the saponifiiable portion in order that each portion may be processed into commercial products.

In the laboratory such unsaponifiable matter can be separated from the saponifiable matter by subjecting oil to saponifiacation by means of an alkali, such as potassium hydroxide, usually in the presence of ethanol. Water is added to form a dilute soap solution and this solution is extracted with large volumes of ethyl ether. The unsaponifiable matter is recovered by distilling off the ether. This process is also used in some industrial processes but is undesirable on commercial scale since it requires contacting large volumes of dilute soap solutions with large volumes of solvent, the use of which is hazardous. In addition, it is a slow process and requires extensive processing for solvent recovery.

It has been proposed to separate the saponifiable portion from the unsaponifiable portion of fish and other marine oils on a commercial scale by saponifying the saponifiable portion of the oil to a solid or semi-solid soap by the action of an aqueous alkali solution on the oil followed by extraction of the soap formed with a solvent, such as ethylene dichloride.

We have found, however, that in the solvent extraction of the saponification product formed by saponifying marine animal oil, there is a very serious disadvantage in that the separation of the solid soap phase and the liquid solvent phase is very slow. Also, the recovery of unsaponificable is very low.

We have now discovered that the efficiency of the extraction step can be greatly improved if it is conducted in the presence of a small proportion of an alkali metal salt of phosphoric acid. When the phosphoric acid salt is present a hard, compact soap is formed which quickly separates from the solvent. Thus, when the phosphate is present a clean separation is obtained in about one hour while up to twenty-four hours are required for separation without the phosphate.

Particularly suitable alkali metal salts of phosphoric acid in accordance with the invention are sodium dihydrogen orthophosphate, disodium hydrogen orthophosphate and sodium tripolyphosphate as well as the corresponding potassium salts. The phosphates are preferably present in amounts up to 6% by weight based on the saponification product and are usually present in a range of 3 to 6%. The phosphates can be added as aqueous solutions or as dry powder with water being added separately. They can also be added as phosphoric acid, which in the alkaline condition of the saponification product will form phosphates in situ. It has been found that if the phosphates are added in amounts greater than 6% in aqueous solution, an undesirably high water content will result in the soap, while the addition of phosphates in an amount greater than 6% as dry crystals will give good separation of the solvent phase but with the associated danger of crystals separating.

It has been found that the addition of other salts, such as sodium sulphate, sodium chloride and sodium silicate, is ineffective according to this invention. Salts such as sodium bicarbonate have the obvious disadvantage of causing the evolution of gas when it is desired to subsequently recover fatty acids by acidification of the soap obtained. It is also not desirable to add salts which are highly alkaline.

The process of this invention may be applied not only to the separation of the saponifiable portion from the unsaponifiable portion of marine oils by the direct saponification of the oils, but also by the saponification of methyl esters of marine oils. The inventive process may also be used where the unsaponifiable matter consists of several components, in which case a series of extracts are obtained, out of which a desired component may be isolated.

Another use of the process of this invention is in the extraction of cetyl alcohol from spermaceti wax, which is obtained by separation from crude sperm whale oil.

In addition to the previously mentioned advantages of the process of this invention, a further important advantage is that the use of the phosphates makes the quantity of water added to the process less critical. In the known processes it is usually necessary to add water in an amount of about 30% by weight based on the anhydrous soap to give an improved separation of solvent and soap. This quantity of water must be such as to not dissolve the soap which remains as a soft solid mass, with the result that the quantity of water must be adjusted with great care. However, with the phosphate present the quantity of water has been found to be much less critical.

It has also been observed that the weights extracted in each contact with solvent are more uniform when phosphates are present and the extracts are usually somewhat lighter in color than when no phosphates ade present. Finally, it has been noted that the presence of the phosphates has no effect on the subsequent treatment of the separated portions.

The invention will now be illustrated by reference to the following non-limitative examples:

EXAMPLE 1

This example illustrates the effectiveness of additions of disodium hydrogen orthophosphate compared with no additions of phosphates upon the extraction of unsaponifiable matter from a teleost liver oil. The effectiveness is measured by volume of the extracts secured in each contact and by the weight of unsaponifiable matter which is secured.

396 pounds of a teleost fish liver oil in a 100 gallon stainless steel reactor were saponified by adding 88 pounds of KOH (90% purity) which was previously dissolved in 88 pounds of water. Both oil and caustic solution were at 70° F. temperature. The alkali solution was added to the oil with vigorous agitation which was continued until the mixture became solid. This time has been found to vary with various teleost liver oils between 2 to 20 minutes. The reaction mixture was allowed to stand further for about 16 hours whereby the saponification reaction became complete. Unsponifiable matter then was extracted with symmetrical ethylene dichloride.

To show the beneficial effect of addition of disodium hydrogen orthophosphate the following experiment was carried out: A 50 gram sample of the saponified mixture was disintegrated in about an equal volume of ethylene dichloride at 70° F. The slurry which was formed was divided equally between two graduated cylinders (1) and (11) and ethylene dichloride was added to make up the total volume of contents of each cylinder to 100 ml. Both slurries were heated to 140° F. with agitation to break up any small lumps of soap and to dissolve the unsaponifiable matter. Both cylinders were then cooled to 70° F. To cylinder (1) was added 3.0 ml. of water (12% of the soap weight) and to cylinder (11) was added 3.0 ml. of water containing 1.25 grams of disodium phosphate (5% of the soap weight). The phosphate was added only prior to the first extract. The mixture was agitated and allowed to settle for 20 minutes. The lower layer of ethylene dichloride containing unsaponifiable matter was removed. Seven extracts in all were removed using 50 ml. of solvent in each contact. The mixtures were heated to 140° F. for the first four contacts and the last three contacts were carried out at or near room temperature.

Soap (1) was soft and voluminous throughout this procedure. Soap (11) was granular and easily drained. The results of this procedure are tabulated as follows:

TREATMENT

| Contact Number | Volume of Extract Removed from 25 grams of Soap | |
| --- | --- | --- |
| | (1) No phosphate added (ml.) | (11) Phosphate added (ml.) |
| 1 | 48 | 62 |
| 2 | 37 | 48 |
| 3 | 50 | 50 |
| 4 | 40 | 50 |
| 5 | 45 | 42 |
| 6 | 36 | 58 |
| 7 | 40 | 49 |
| Combined Extracts | 296 | 359 |
| After removal of solvent by distillation: Weight of total unsap. extracted (grams) | 1.9 | *3.1 |

*93.8% of the quantity in the soap, based on measurements of the Vitamin A as a guide to the unsaponifiable content.

EXAMPLE 2

This is an example of the effective use of a mixture of two of the phosphates included within the group of our invention.

A teleost liver oil was saponified with KOH in the same manner as in Example 1. A 50 gram sample of the saponified mixture was then extracted with ethylene dichloride after being grained with water containing 3.47% of disodium and 1.00% of monosodium phosphate. The saponified mixture was disintegrated in 150 ml. of ethylene dichloride and transferred to an extracting vessel with a further 30 ml. of solvent. The slurry formed was heated to 60° C. with agitation, the phosphate mixture added in 5 ml. of water and the mixture cooled to about 20° C. and allowed to settle for 5 minutes before removing the extract. Four additional extracts of 150 ml. each were added. An additional 2 ml. of water was added to the second extract but this did not change the appearance of the soap curd or the rate of settling of the solvent extract. The soap curd was compact and settled quickly.

The results of the experiment are tabulated as follows:

Weight of soap taken _____ g__ 50
Total volume of 5 extracts _____ ml__ [1] 740
Weight of unsap. matter in 5 extracts _____ g__ 3.10

[1] This is 81% of the quantity in the soap, based on measurements of Vitamin A content.

EXAMPLE 3

This example shows the effectiveness of sodium tripolyphosphate addition. A saponification was carried out in the same manner as in claim 1 and a sample of the saponified mixture was extracted with ethylene dichloride after being grained with water containing various amounts of sodium tripolyphosphate. The extraction procedure was essentially the same as in Example 2. The tripolyphosphate was dissolved in 7 ml. of boiling water. The resulting soap was hard and compact.

The results of the experiment are tubulated as follows:

TREATMENT

| | (1) | (2) | (3) |
| --- | --- | --- | --- |
| Weight of soap, (g.) | 50 | 50 | 50 |
| Additive (Percent of soap): Sodium tripolyphosphate in 7 ml. water (percent) | 1 | 2 | 3 |
| Total volume of 5 extracts (ml.) | 724 | 737 | 733 |
| Weight of unsap. extracted in gms | 2.74 | 3.02 | 2.86 |

EXAMPLE 4

This example illustrates the use of additions of disodium hydrogen orthophosphate in a process for extracting unsaponifiable matter from soaps which have been prepared from the methyl esters of dogfish liver oil fatty acids.

To a 273 pound batch of methyl esters of dogfish liver oil, containing glyceryl ethers, was added, at room temperature, with vigorous agitation, 33.1 pounds of potassium hydroxide in 33 pounds of water. The saponification value of the mixture was 100 mg. KOH per gram and the unsaponifiable content was 37.6%. After allowing the mixture to react for 16 hours, the resulting mixture was disintegrated in about an equal volume of ethylene dichloride and the resulting slurry transferred to a heated agitated extractor. Solvent was added to make a total addition of 300 gallons. The mass was heated to 130° F. (25 minutes) then cooled to room temperture. 9 pounds of disodium phosphate dissolved in 55 pounds of hot water were then added. The phosphate was 4.9% of the estimated weight of potassium soap. The water content of the soap was 30%.

Unsaponifiables were extracted from the soap curd by 7 successive extracts with ethylene dichloride, using 300 gallons of solvent for each extract. Each extract was heated to 140° F., then cooled to 70° F. The results for the first seven steps of the extraction procedure are tabulated as follows:

| Extract number | Weight of unsaponifiable extracted (lbs.) | Percent of total content unsapon. extracted, percent |
| --- | --- | --- |
| 1 | 30.4 | 29.7 |
| 2 | 17.5 | 17.0 |
| 3 to 7 combined | 37.9 | 36.9 |
| 1 to 7 combined | 85.8 | 83.6 |

EXAMPLE 5

This example illustrates the recovery of unsaponifiable matter from ratfish liver oil with the use of disodium hydrogen orthophosphate.

450 lbs. of the liver oil of the ratfish (*Chimaera monstrosa*) were saponified by a proces as described in Example 1. By analysis the oil had an unsaponifiable content of 30.1% and a saponification value of 142.5 mg. KOH per gram. 103.4 pounds of commercial grade KOH were dissolved in the same weight of water, the solution cooled to room temperature and then added with vigorous agitation to the oil. After standing for 16 hours, the saponified mixture was vigorously disintegrated in 110 gallons of ethylene dichloride. The slurry was heated to 110° F. and a solution of 20 pounds of disodium phosphate in 70 pounds of hot water was added. The unsaponifiable matter was separated from the soap by multiple contacts with ethylene dichloride. After 9 contacts the total volume of extracting solvent was 2170 gallons. The extracts separated quickly and the soap volume remained constant after each extraction at 104 gals.

The total weight of unsaponifiable matter recovered after removal of solvent was 99.6 pounds.

The recovery from 9 contacts was 73.7% of the analyzed content of unsaponifiable matter.

EXAMPLE 6

In this example, Part 1, beneficial effect upon settling is noted following the addition of powdered disodium phosphate to a saponification product to which water had been added in a prior step. In Part 2, the further addition of water is observed to give an improvement in settling. This is at a slow rate without phosphate. With phosphate addition the mixtures are insensitive to large variations in the addition of water.

396 pounds of fish liver oil were saponified with caustic potash in a 100 gallon stainless steel reactor. The potassium soap was extracted with ethylene dichloride in a 500 gallon heated, agitated mild steel extractor. 70 pounds of water (17%) was added to grain the soap. Low recoveries of unsaponifiables from previous batches of soap made from the same oil had shown that this material was difficult to extract. Soap volume after seven extracts was 40 inches in the tank instead of the usual 20 to 25 inches in the tank. The soap-ethylene dichloride soap mixture was then studied as follows:

*Part 1.*—50 gram samples were transferred to graduates and 50 ml. of ethylene dichloride added. Cylinder (1) was heated to 100° F. and shaken several times to mix thoroughly. Cylinder (11) was also heated to 100° F. and anhydrous disodium phosphate powder was added at 5% of the weight of the volatiles-free sample. It was shaken for several minutes to dissolve the phosphate, then the ethylene dichloride layer (lower) was allowed to separate.

The results of this extraction procedure are tabulated as follows:

| Settling time minutes | Temperature of settling (° F.) | Volume of Extract Removed (ml.) | |
|---|---|---|---|
| | | (1) No phosphate | (11) Phosphate added |
| 10 | 70 | 12 | 14 |
| Same sample then heated to 130 deg. then allowed to stand: | | | |
| 2 | 130 | 2 | 22 |
| 10 | 130 | 12 | 34 |

*Part 2.*—To another 10 gram sample of soap-solvent mixture was added 30 ml. of ethylene dichloride. Water was added in small increments to attempt to improve the soap grain to produce a more compact curd and a larger volume of extract.

The results of this extraction process are tabulated as follows:

| Volume of extra water added (ml.) | Volume of Extract Settled (ml.) | |
|---|---|---|
| | (1) No phosphate | (11) Phosphate added |
| 0 | None | 25 |
| 3 | 25 | 25 |
| 4 | ¹ 25 | 28 |
| 5 | ¹ Cream | 30 |

¹ Very slow settling.

EXAMPLE 7

This example illustrates the improved extraction of vitamin A when disodium phosphate is added to the soap.

The extracts secured in cylinders (1) and (11) in Example 6, Part 1, after 10 minutes standing at 130° F. were separated and the vitamin A content determined to be:

*Total units of vitamin A (international units) in solvent phase*

Cylinder (1):
    No phosphate _____ 31,500
Cylinder (11):
    Phosphate added _____ 78,500

EXAMPLE 8

This example shows the application of disodium phosphate to the extraction of the sodium soap of spermacetic wax with ethylene dichloride.

A 250 gram lot of spermacetic wax was saponified by adding a solution of 47.7% sodium hydroxide in water to the melted wax with vigorous agitation. An amount of NaOH 16% in excess of the saponification value of the wax was used. The reaction mixture was allowed to saponify for 6 hours at about 90° C. The saponified mixture was disintegrated in 4 volumes of ethylene dichloride. The soap curd settled after standing for 16 hours but after agitation no phase separation occurred. Disodium phosphate equal to 3% of the wax weight was added at 67° C. but still no phase separation occurred. Addition of more water equal to 8% of the weight of wax produced no separation. A further addition of 3% disodium phosphate powder produced a hard and compact curd that settled well. Five additional extracts of the soap curd, each time with triple volume of solvent, were made at 67° C. On the 4th extract 6% more water was added to improve separation.

The recovery of products and their analysis are as follows:

| Extract | Weight of cetyl alcohol recovered (grams) | Recovery of cetyl alcohol, percent of total wax |
|---|---|---|
| No. 1 | 76.2 | 30.5 |
| No. 2 to 6 combined | 30.8 | 12.3 |
| Not extracted from soap | | 1.3 |

Although the above examples all relate to sodium salts, it is to be appreciated that the potassium salts are also effective and considered to be within the scope of this invention.

The embodiments of the invention in which an exclusive property or privilege is claimed are defined as follows:

1. In a process for separating saponifiable and unsaponifiable matter in marine animal oil wherein the oil is subjected to saponification and the saponification product obtained is subjected to solvent extraction, the step which comprises carrying out the subsequent solvent extraction in the presence of an alkali metal salt of phosphoric acid.

2. A process as claimed in claim 1 wherein the alkali metal salt is formed in situ in the saponification product from phosphoric acid.

3. A process as claimed in claim 1, wherein the alkali metal salt of phosphoric acid is selected from the group consisting of disodium hydrogen orthophosphate, dipotassium hydrogen orthophosphate, sodium dihydrogen orthophosphate, potassium dihydrogen orthophosphate, sodium tripolyphosphate and potassium tripolyphosphate.

4. A process as claimed in claim 3 wherein the salt is present in an amount of up to 6% by weight based on the saponification product.

5. A process as claimed in claim 4 wherein the marine animal oil is obtained from fish liver.

6. A process as claimed in claim 4 wherein the marine animal oil is obtained from the liver of a teleost fish.

7. A process as claimed in claim 4 wherein the marine animal oil is obtained from the liver of the dogfish shark, "*Squalus suckleii.*"

8. A process as claimed in claim 4 wherein the marine animal oil is obtained from the liver of the ratfish "*Chimaera monstrosa.*"

9. In a process for separating saponifiable and unsaponifiable matter in fish liver oil wherein the oil is subjected to saponification and the saponification product obtained is subjected to solvent extraction, the step which comprises carrying out the subsequent solvent extraction in the presence of 3 to 6% by weight of an alkali metal salt of phosphoric acid selected from the group consisting of disodium hydrogen orthophosphate, sodium dihydrogen orthophosphate and sodium tripolyphosphate.

10. In a process for separating saponifiable and unsaponifiable matter in marine oil wherein the oil is converted to a methyl ester thereof and the ester is subjected to saponification and the saponification product obtained is subjected to solvent extraction, the step which comprises carrying out the subsequent solvent extraction in the presence of 3 to 6% by weight of an alkali metal salt of phosphoric acid selected from the group consisting of disodium hydrogen orthophosphate, sodium dihydrogen orthophosphate and sodium tripolyphosphate.

References Cited
UNITED STATES PATENTS 2,744,125   5/1956   Meeks _____ 260—412.8 X ALEX MAZEL, *Primary Examiner.*

HENRY R. JILES, *Examiner.*

A. M. TIGHE, *Assistant Examiner.*